Patented May 4, 1948

2,440,732

UNITED STATES PATENT OFFICE 2,440,732

AQUEOUS FORMALDEHYDE STORAGE

Edward S. Yates, Niagara Falls, N. Y., assignor to E. I. du Pont de Nemours & Company, Wilmington, Del., a corporation of Delaware No Drawing. Application July 19, 1945, Serial No. 606,037

4 Claims. (Cl. 260—606)

This invention relates to storage, including the shipping in storage, of aqueous solutions of formaldehyde having a concentration of at least 45% by weight of formaldehyde.

Heretofore, formaldehyde which was to be kept in storage or in shipping containers for a considerable period of time has usually been stored or sold either in the form of an aqueous solution containing between approximately 30% to 37% by weight of formaldehyde, or in the form of paraformaldehyde, a solid composed of at least 90% formaldehyde. Paraformaldehyde is limited in its use due to its insolubility, or at least low degree of solubility, in water and other solvents.

In aqueous solution, dissolved formaldehyde is present as an equilibrium mixture of formaldehyde monohydrate or methylene glycol,

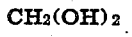

and a series of low molecular weight polymeric hydrates or polyoxymethylene glycols, having the type formula, HO·(CH2O)n·H. The state of equilibrium is determined by the temperature and formaldehyde concentration. High temperatures and low concentrations favor the monohydrate whereas low temperatures and high concentrations favor the polymeric hydrates. Polymeric hydrates having a degree of polymerization greater than that of the trimeric hydrate,

are only partially soluble at room temperature and precipitate from solution when present to any considerable extent. Solutions whose formaldehyde concentration is 30% or less do not contain appreciable quantities of these higher polymeric hydrates at room temperature. High strength solutions contain considerable concentrations of these polymers and must accordingly be kept at temperatures higher than room temperature to maintain solution. On cooling high strength solutions, the higher polymeric hydrates which are already present precipitate and additional quantities of these polymers are formed and then precipitate as the solution comes to the state of equilibrium prescribed by the lower temperature. Precipitated polymers also increase in molecular weight and become increasingly insoluble. This gradual increase of molecular weight, known as aging, continues until the precipitated polymers have attained a molecular weight which is so high that they may be regarded as practically insoluble.

It is believed that the melting time of formaldehyde pastes, i. e. formaldehyde solutions which have gelled due to precipitation of formaldehyde polymers, is an index of the molecular weight of the polymeric hydrates of which they are composed. If aging has been considerable and high polymers have been produced, complete depolymerization and solution would require so long a time that the paste is substantially irreversible. If the polymeric hydrates which were precipitated on cooling the high strength solution have aged little, a clear solution is formed almost immediately when the paste is warmed to the temperature at which the original solution was stable, for at this point its content of polymeric hydrates is completely soluble.

The economy of storing aqueous solutions of formaldehyde containing a higher concentration of formaldehyde than 37% is obvious, and some success has been achieved in storing somewhat higher strength formaldehyde solutions. The addition of a solution stabilizer such as methanol, urea or melamine to aqueous solutions of formaldehyde have permitted the storage of such solutions having slightly higher than 37% concentration. Formaldehyde solutions having a concentration of 37% formaldehyde, and solutions of slightly higher concentration, can also be stored at a temperature higher than that at which formaldehyde polymer is precipitated. 6% to 15% methanol by weight has been employed for prevention of undesirable polymerization in 37% formaldehyde solutions. Alternatively, storage at 35° C. or higher will maintain a clear solution of 37% formaldehyde with a methanol content of less than 1%. The two methods mentioned above for controlling polymerization in 37% formaldehyde solutions are not applicable to high strength solutions, i. e., solutions of 45% formaldehyde and higher. The amount of stabilizer required to prevent polymer precipitation is so great as to be impractical and uneconomical. The maintenance of solution by heat requires that 50% and 60% solutions be maintained at about 55–65° C. and 65–70° C., respectively. Fifty percent formaldehyde can be loaded in insulated tank cars at a temperature above 55° C. and shipped satisfactorily for short hauls, providing the temperature does not drop below 55° C. For 60% formaldehyde where temperature must be maintained above 65° C., this method of handling appears impractical. On long storage at these high temperatures, formaldehyde solutions become increasingly unstable chemically and lose strength with formation of formic acid and methanol. The increased acid content is particularly undesirable. While it is possible to ship in insulated tank cars at higher than atmospheric temperatures, no practical means has been found by which drum lots and smaller can be kept warm while shipping.

It is an object of this invention to provide a satisfactory method of storing aqueous solutions of formaldehyde having a concentration of 45% to 75% by weight of $CH_2O$.

It is another object of this invention to provide a satisfactory method of storing aqueous solutions of formaldehyde having a concentration of 45% to 75% by weight of $CH_2O$ over extended periods of time without objectionable irreversible polymerization and without objectionable formation of formic acid.

Other objects of the invention will appear hereinafter.

The above objects may be accomplished, in general, by cooling an aqueous solution of formaldehyde containing between 45% and 75% by weight of $CH_2O$ to below room temperature (21° C.) to form a gel or paste of the solution and maintaining the same in such cooled condition.

Although methanol-free formaldehyde solutions containing 45% to 75% $CH_2O$, upon cooling to below room temperature, rapidly precipitate polymer and become pasty or gel-like masses, it has been found in accordance with this invention that such pastes or gels are readily converted to clear, substantially polymer-free liquids upon warming the same even after storage for a considerable period of time. Although I do not wish to be restricted to any particular theory, it appears that low molecular weight polymers which are readily reversible upon heating are rapidly formed upon cooling. At the colder temperature the aging of the polymers to form irreversible high molecular weight polymers is arrested, or at least greatly reduced, and therefore, the high strength formaldehyde solutions can be stored at the low temperature for long periods of time. At the low storage temperatures the decomposition of formaldehyde to formic acid and methanol, which takes place at high temperature storage, is also greatly reduced or completely eliminated.

In accordance with the preferred method of carrying out the process of this invention aqueous solutions of formaldehyde containing 45% to 75% $CH_2O$ are cooled to below room temperature (21° C.), preferably to a temperature between 0° C. and 15° C., and maintained below room temperature until it is desired to remove the same from storage. If this is done soon after the high-strength formaldehyde solutions have been prepared it will avoid formation of irreversible polymers or formic acid between such solution preparation and storage; however, the cooling and cold-storage also finds useful application to formaldehyde solutions which already contain some irreversible polymers and formic acid to prevent or delay further formation of these objectionable ingredients.

The cooling may be accomplished by placing the formaldehyde solution in a refrigerator chamber, by circulating brine or other cooling fluid through the solution, by packing with dry ice or in any other desired manner.

The cold-stored, high-strength formaldehyde pastes or gels may be readily converted to clear liquid solutions by heating, thus providing ready means for removal of the formaldehyde from the container. The formaldehyde solution, at the time of heating, may, if desired, be diluted to form a less concentrated formaldehyde solution.

The conversion to liquid solution by warming can be carried out by heating the paste to a temperature at which a solution of the composition involved is known to be a clear liquid. In the case of 50% methanol-free solution this is 55° C. and in the case of a 60% solution, 65° C. The temperature of the solution may, however, be raised to a higher temperature if it is desired to convert the same to clear liquid solution in a shorter period of time.

When the high-strength formaldehyde is to be stored in large containers, for example, a tank car, the container may be provided with internal coils through which cooling fluids can be circulated to cool the same and maintain it at a desired temperature, or steam or other heating fluid may be circulated therethrough to heat the solution to convert it to clear liquid. Smaller containers may be maintained in cooled storage chambers, and the paste may be converted to liquid by passing steam in direct contact with the paste, thereby diluting the same while converting it to liquid.

The 45% to 75% aqueous formaldehyde solutions cold-storaged in accordance with this invention may or may not contain solution stabilizers such as methanol, urea, melamine or the like. By use of such stabilizers it is possible to combine the effects of both low temperature and stabilizing agents to further extend the time of storage without formation of irreversible polymers.

The following examples illustrate the effect of low temperature storage upon high strength formaldehyde solutions under varying conditions. The invention is not to be limited to the specific details given in the examples.

*Example I*

Different concentrations of formaldehyde were stored for 15 days at various temperatures and "melted" to clear solutions in the times shown below:

| Concentration of Solution | Melting Time in Minutes (Defined below) Stored at— | | |
|---|---|---|---|
| | 25–30° C. | 17–19° C. | 5–15° C. |
| 50% HCHO | 13 | 7 | 4 |
| 60% HCHO | 29 | 9 | 7 |
| 70% HCHO | over 9 hours. | 41 | 14 |

"Melting time" is defined as time in minutes required for the paste to go over to a clear solution when a 25 g. sample in a 23 x 145 mm. Pyrex test tube is immersed in a 90–92° C. water bath. This example shows clearly that the time to reliquefy the polymer decreases with lowering storage temperatures and increases with the strength of the solution stored.

*Example II*

The effect of lowered temperature on increasing the time of storage after which the formaldehyde can be restored to a clear solution by heating is even more strikingly apparent in the following series of experiments:

| Storage Temperature | Storage Time After Which the Polymer Melted to a Clear Solution in 8 Minutes | |
|---|---|---|
| | 50% Solution | 60% Solution |
| 0–7° C | 86 days | 49 days. |
| 17–19° C | 15 days (approx.) | 15 days (approx.). |
| 35° C | 6 | 2.4. |

Example III

Storage of 500 lb. samples of 50 percent formaldehyde showed the following results:

|  | Liquefied After Heating With a Steam Coil | | |
|---|---|---|---|
|  | 3 Days Storage | 9 Days | 48 Days |
|  | Hrs. | Hrs. | Hrs. |
| Stored Outdoors at Winter Temperatures. (Approx. 0–6° C.) | 2 | 2½ | 5 |
| Stored at Room Temperature. (Approx. 26–31° C.) | 2 | 2½ | Only ¾ in soln. after 25 hrs. Heating. |

This experiment shows very clearly that while there is some advantage in storing at low temperatures even when the period of storage is only one or two weeks, the storage for prolonged periods at low temperature has great value in maintaining a stable product.

Since it is obvious that many changes and modifications can be made in the above-described details without departing from the nature and spirit of the invention, it is to be understood that the invention is not to be limited to said details except as set forth in the appended claims.

I claim:

1. The method of storing or preserving an aqueous solution of formaldehyde containing 45% to 75% by weight $CH_2O$ which comprises cooling the solution to a temperature below room temperature (21° C.) whereby to form a gelled or pasty mass, and maintaining the temperature of said mass below room temperature during storage.

2. The method of storing or preserving an aqueous solution of formaldehyde containing 45% to 75% by weight $CH_2O$ which comprises cooling the solution to a temperature between 0° C. and 15° C. whereby to form a gelled or pasty mass, and maintaining the temperature of said mass between 0° C. and 15° C. during storage.

3. The method of handling an aqueous solution of formaldehyde containing 45% to 75% by weight $CH_2O$ which comprises cooling the solution to a temperature below room temperature (21° C.), whereby to form a gelled or pasty mass, storing the mass below room temperature to prevent formation therein of objectionable quantities of irreversible formaldehyde polymers, and heating the formaldehyde to a temperature at which said formaldehyde solution is a clear liquid.

4. The method of handling an aqueous solution of formaldehyde containing 45% to 75% by weight $CH_2O$ which comprises cooling the solution to a temperature between 0° C. and 15° C. whereby to form a gelled or pasty mass, storing the mass at a temperature between 0° C. and 15° C. to prevent formation therein of objectionable quantities of irreversible formaldehyde polymers, and heating the formaldehyde to a temperature at which said formaldehyde solution is a clear liquid.

EDWARD S. YATES.

REFERENCES CITED

The following references are of record in the file of this patent:

Walker, "Formaldehyde," 1944, pages 42, 43 and 44.